United States Patent [19]

Kojima et al.

[11] Patent Number: 4,628,176
[45] Date of Patent: Dec. 9, 1986

[54] APPARATUS FOR SETTING SCHEDULES OF A RESISTANCE WELDING MACHINE

[75] Inventors: Koji Kojima, Tokyo; Kiyosi Kajiwara, Saitama, both of Japan

[73] Assignee: Kabushiki Kaisha Tetrak, Tokyo, Japan

[21] Appl. No.: 725,624

[22] Filed: Apr. 22, 1985

[30] Foreign Application Priority Data

Sep. 19, 1984 [JP] Japan .................................. 59-19638

[51] Int. Cl.⁴ .............................................. B23K 11/24
[52] U.S. Cl. ...................................... 219/110; 219/114
[58] Field of Search ...................... 219/110, 114, 117.1, 219/108; 364/477

[56] References Cited

U.S. PATENT DOCUMENTS 4,456,809 6/1984 Jones et al. .......................... 219/114
4,458,132 7/1984 Reynolds et al. .................... 219/114
4,490,795 12/1984 Calcagno ............................. 219/110

FOREIGN PATENT DOCUMENTS 3029953 3/1982 Fed. Rep. of Germany ...... 219/110

Primary Examiner—Clifford C. Shaw

[57] ABSTRACT

Items constituting a resistance welding schedule are set to desired numerical values by pressing three kinds of keys, namely a shift key for designating one item after another, and increment and decrement keys for setting or changing a numerical value corresponding to each designated item. Each item is displayed in an individual display section of a display unit, with the display sections being made to blink sequentially as each corresponding item is designated. The numerical values are displayed directly item by item and are set sequentially as the respective items of the schedule are designated.

5 Claims, 8 Drawing Figures

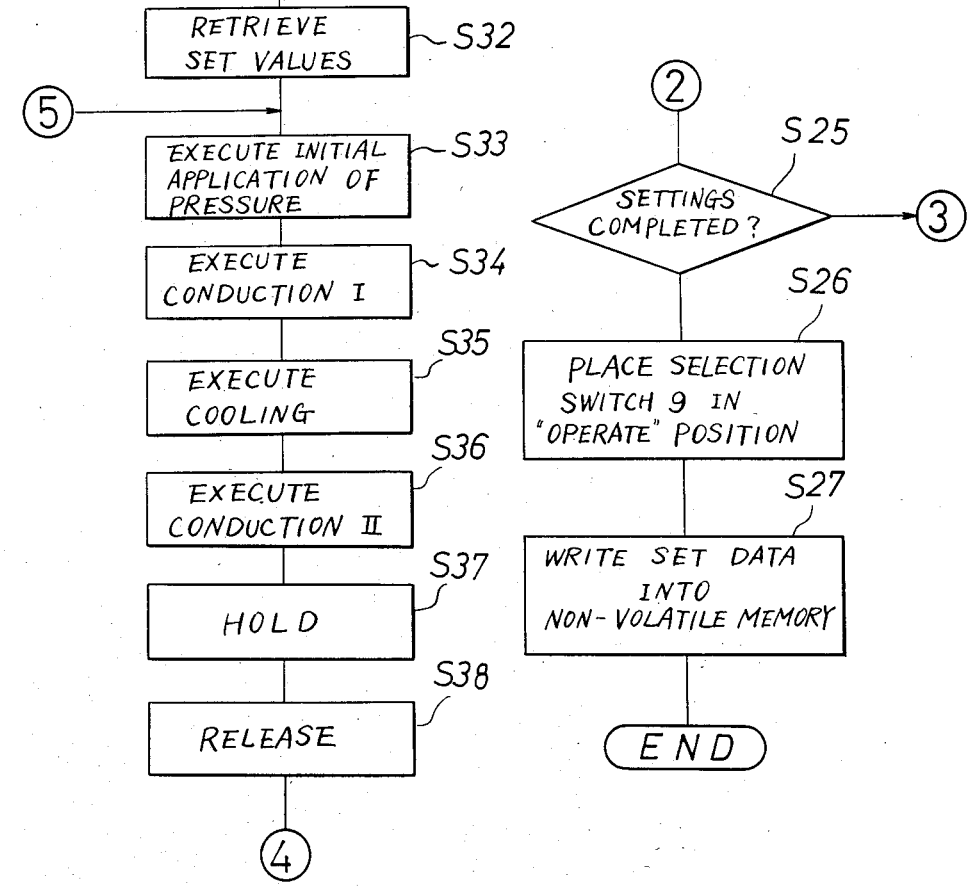

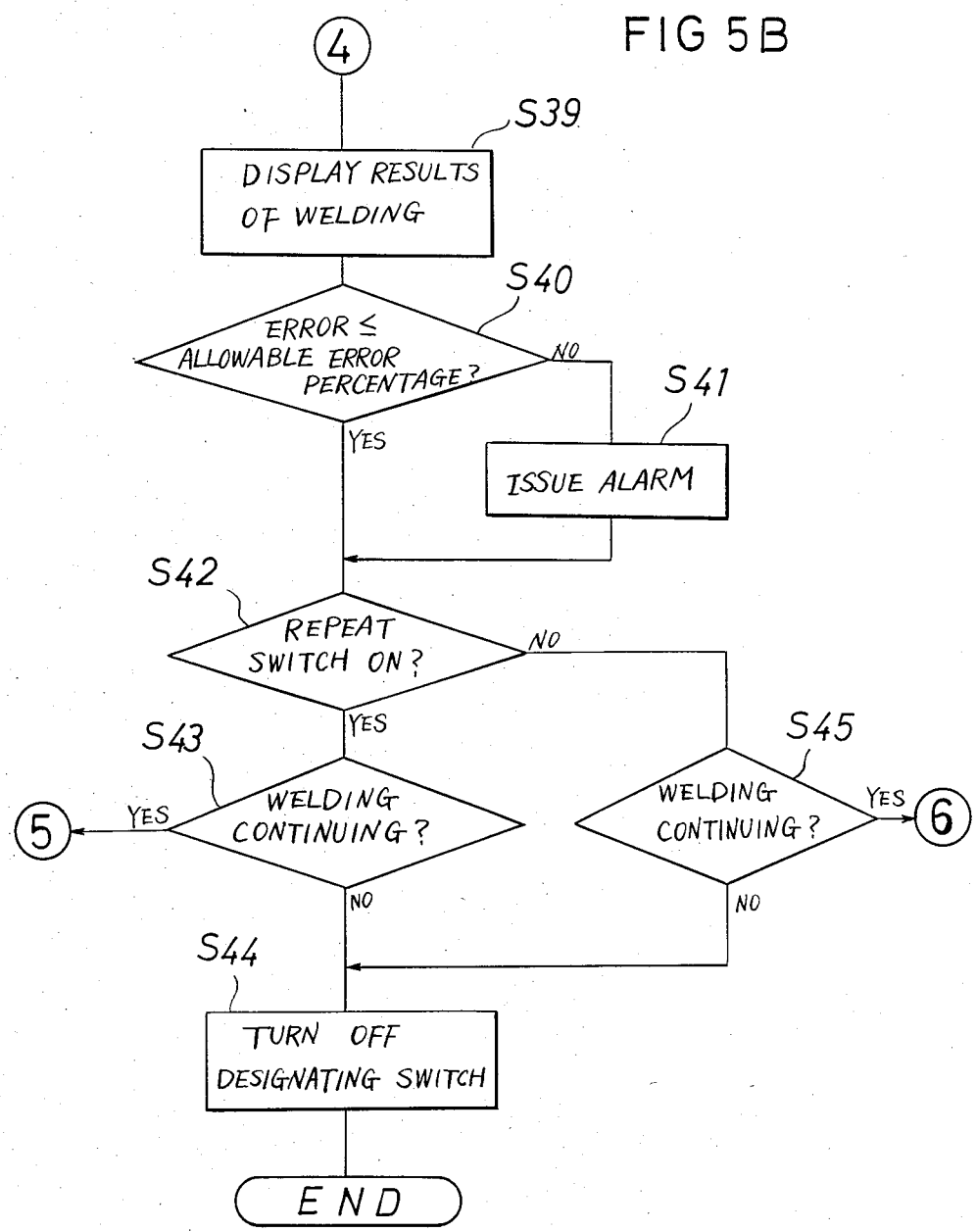

APPARATUS FOR SETTING SCHEDULES OF A RESISTANCE WELDING MACHINE

BACKGROUND OF THE INVENTION

1. Field of the Invention

This invention relates to an apparatus for setting the schedules of a resistance welding machine.

2. Description of the Prior Art

Resistance welding is widely employed in joining together the metal plates of assemblies such as automobile bodies and it is now possible to control the sequence of a series of resistance welding steps by microcomputer. The parameters that characterize a resistance welding operation, such as the duration of applied pressure and current and the magnitude of the applied current, are set in accordance with the particular welding sequence schedule.

Conventionally, methods of setting a resistance welding schedule fall into two main groups, namely methods that rely upon digital switches and those that employ keyboard switches.

The digital switch configuration is advantageous in that the switches themselves also serve as indicating means and enable the retention of set data even in the event of a power cutoff. On the other hand, the wiring connecting the digital switches with a control unit is of some complexity and the system is susceptible to failures such as poor electrical contact because the digital switches per se rely upon contact members. Still another disadvantage with the digital switch system is that a large number of these switches are necessary for a welding operation of the type in which one among a plurality of set values in a welding schedule is selected through use of a single control unit. The greater number of switches further complicates the wiring between the switches and the control unit and raises overall cost.

A prior-art example of a schedule setting method effected by keyboard switches is disclosed in the specification of Japanese Patent Application Laid-Open No. 58-176087. The art disclosed describes an arrangement in which such parameters as the duration of initial pressure application, the duration of current flow, i.e., conduction, and the magnitude of the current are set in accordance with a welding schedule by manually operating numeric keys for numerical values 0 through 9 as well as a variety of function keys. However, since one and the same display monitor is used to display all of the set values, the operator cannot readily tell which item of data is in the process of being set. The operator is also confronted with a large number of different types of keys. Such a configuration complicates the setting operation and invites operator input error.

SUMMARY OF THE INVENTION

Accordingly, an object of the present invention is to provide an apparatus for setting the schedule of a resistance welding machine without encountering the aforementioned difficulties of the prior art.

A more specific object of the present invention is to provide an apparatus for setting the schedule of a resistance welding machine, the apparatus having the capability of setting and changing each of the values in a number of welding schedules by means of just three kinds of keys, wherein the values set are displayed directly in consecutive order to facilitate the setting procedure.

According to the present invention, the foregoing objects are attained by providing an apparatus for setting a schedule of a resistance welding machine, the apparatus comprising a shift key for designating each of a number of items constituting a resistance welding schedule, an increment key for setting an item, which is designated by the shift key, to a numerical value by incrementing a currently prevailing numerical value of the item, a decrement key for setting an item, which is designated by the shift key, to a numerical value by decrementing a currently prevailing numerical value of the item, a display unit operatively associated with the shift key and with the increment and decrement keys for displaying, item by item, the set numerical values of the respective items constituting the resistance welding schedule, and control means comprising a microprocessor for executing control to sequentially designate each item of the resistance welding schedule on the basis of a signal produced each time the shift key is pressed, set a designated item to a numerical value on the basis of signals produced when the increment and decrement keys are pressed, and display on the display unit and store in memory the set numerical value Such items as welding duration, duration of applied pressure and welding current constituting each of a number of resistance welding schedules are sequentially designated by pressing the shift key, and each designated item is set to a desired numerical value by pressing the increment and decrement keys. Thus, these operations are capable of being performed by just three kinds of keys. Moreover, each item is displayed in an individual display section of the display unit, and the display sections are made to blink sequentially as each corresponding item is designated. The numerical values are displayed directly item by item and are set sequentially as the respective items of the schedule are designated. Accordingly, the setting of a resistance welding schedule can be performed in simple and easy fashion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4(A), 4(B), and 4(C) show a flowchart illustrating a procedure for setting a welding schedule according to the present invention; and FIGS. 5(A) and 5(B) show a flowchart illustrating a procedure for performing a welding operation according to the present invention.

DESCRIPTION OF THE PREFERRED EMBODIMENT

Reference will now be had to the accompanying drawings to describe a preferred embodiment of an apparatus for setting the schedule of a resistance welding machine according to the present invention.

Figure 1:
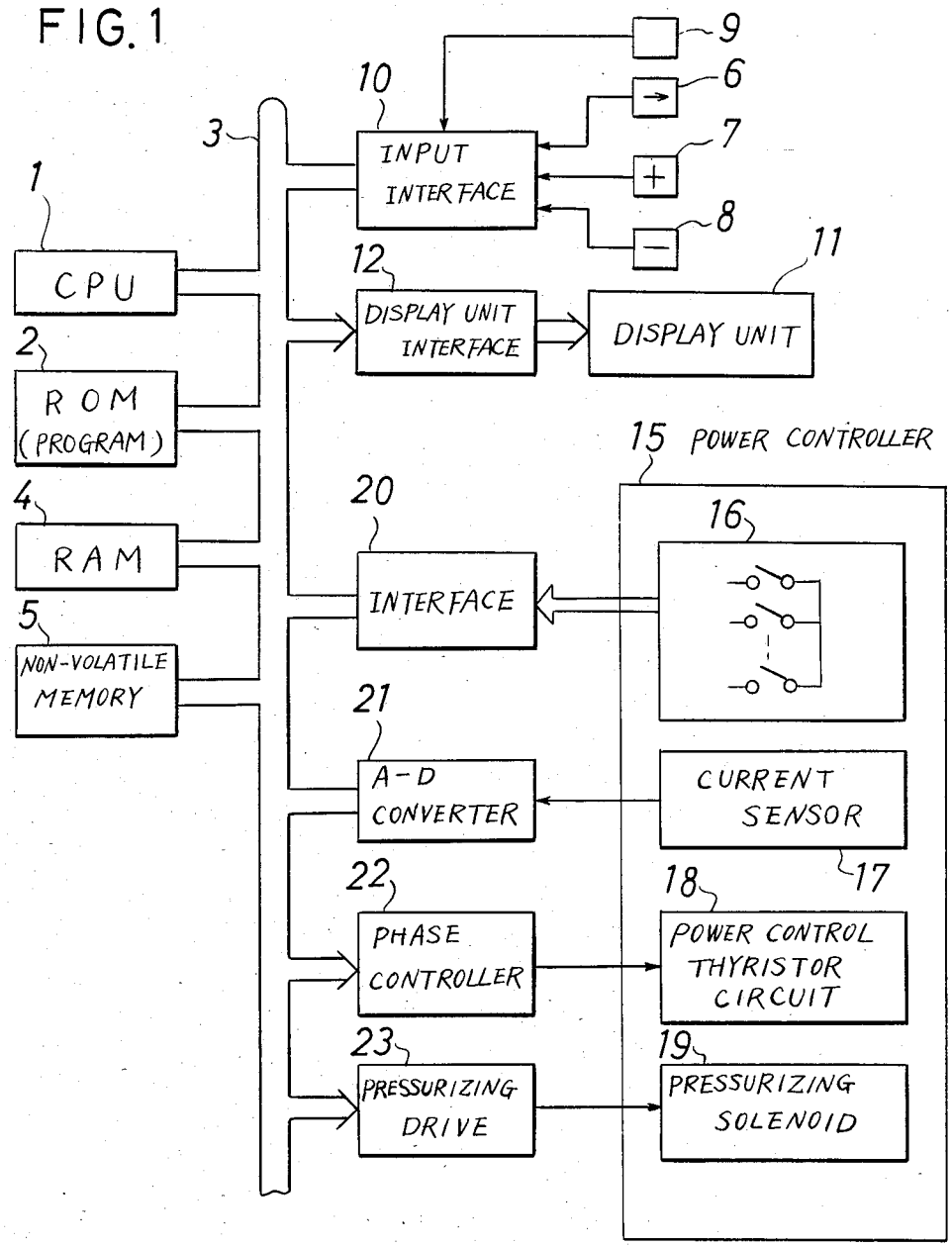
FIG. 1 is a block diagram illustrating a preferred embodiment of an apparatus for setting the schedule of a resistance welding machining according to the present invention.

As shown in the functional block diagram of FIG. 1, the apparatus of the present invention includes a central processing unit (herafter referred to as a CPU) 1 constituted by a microprocessor for overall control of the apparatus, a read-only memory (hereafter referred to as a ROM) 2 connected to the CPU 1 via a bus 3 and storing programs executed by the CPU, a random-access memory (hereafter referred to as a RAM) 4 similarly connected to the CPU 1 via the bus 3 for holding data such as the results of calculations performed by the CPU 1, and a non-volatile memory 5 for storing set values that make up a schedule of a resistance welding machine, which is not shown.

According to a feature of the present invention, the apparatus of FIG. 1 further includes a shift key 6, an increment key 7 and a decrement key 8, the functions whereof will be described in more detail below. Also included are a selection switch 9 having "SET" and "OPERATE" positions for placing the control system, inclusive of the CPU 1, in a welding schedule setting mode or an operating mode, and an input interface 10 to which the keys 6 through 8 and the selection switch 9 are connected for being interfaced with the CPU 1 via the bus 3 so that output signals produced by pressing the keys 6 through 8, as well as a switch signal produced by operating the selection switch 9, may be read in by the CPU 1. A characterizing feature of the apparatus of FIG. 1 is a display unit 11 for displaying, item by item, each of the set values constituting a resistance welding schedule. The display unit 11 is connected to the CPU 1 via the bus 3 and an interface 12 for display purposes.

Figure 2:
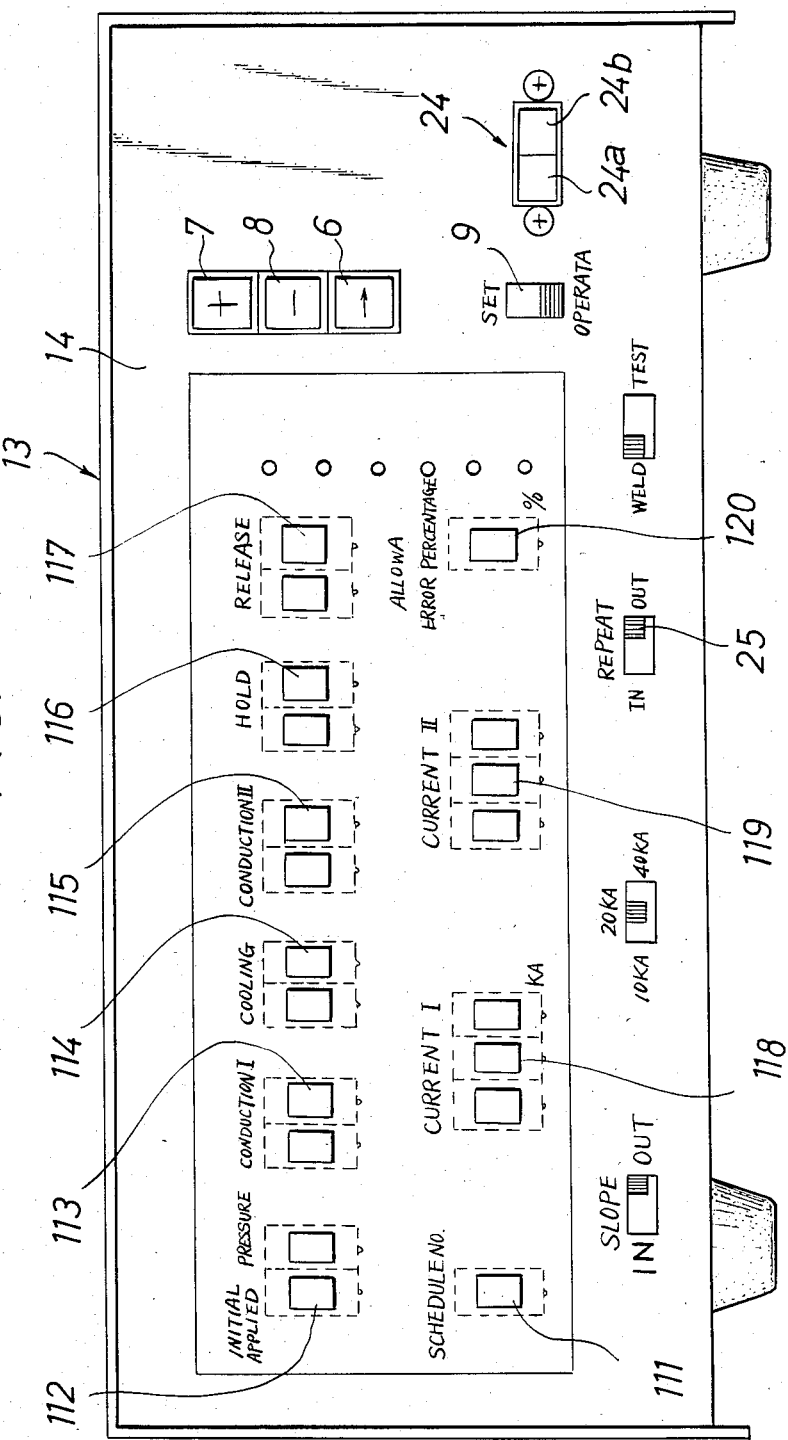
FIG. 2 is a front view illustrating part of a schedule display panel included in the apparatus of the present invention.

As shown in FIG. 2, the display unit 11 includes a single-digit display section 111 for displaying the schedule number of each of a variety of welding schedules, and display sections 112 through 120 that correspond to the items constituting a welding schedule. These display sections include a two-digit display section 112 for displaying the duration of initial pressure application, a two-digit display section 113 for displaying a first conduction time I, namely the duration of a first burst of current, a two-digit display section 114 for displaying the duration of cooling effected upon temporarily halting the flow of current in the first conduction process, a two-digit display section 115 for displaying a second conduction time II, namely the duration of a second burst of current effected after cooling, a two-digit hold display section 116 for displaying a duration over which applied pressure is held even after the end of the second conduction process, a two-digit release display section 117 for displaying a duration over which applied pressure is removed, a three-digit display section 118 for displaying a welding current value I corresponding to the first conduction time I mentioned above, a three-digit display section 119 for displaying a welding current value II corresponding to the second conduction time II mentioned above, and a single-digit allowable error display section 120 for displaying as a percentage an allowable error between a set value of current and the magnitude of the current which actually flows. It should be noted that the various durations of time mentioned above are expressed in terms of numbers of cycles, these appearing as numerical values in the two-digit display sections 112 through 117. A control box 13 has a front panel 14 on which the display sections 111 through 120 are arranged. Also disposed on the front panel 14 of the control box 13 are the shift key 6, marked "→", the increment key 7, marked "+", the decrement key 8, marked "−", and the selection switch 9.

Returning to FIG. 1, there is shown a power controller 15 operative when a welding schedule is executed and comprising a designating switch 16 for designating a welding schedule, which corresponds to the aforementioned welding schedule number, in accordance with the welding specifications of the workpiece being welded, a current sensor 17 comprising a current transformer, a toroidal coil or the like for sensing welding current, a power control thyristor circuit 18 for controlling welding power, and a pressurizing solenoid 19 for applying pressure to the workpiece.

The schedule designating switch 16 is connected to the CPU 1 via an interface 20 and the bus 3, and the output signal of the current sensor 17 is converted into a digital quantity by an AD converter 21 so that the signal may then be read in by the CPU 1 in digital form. The input of the power control thyristor circuit 18 is connected to the output of a phase control circuit 22 so that the phase of the thyristor circuit may be controlled by the circuit 22 in response to a phase control command the latter receives from the CPU 1 via the bus 3. Connected to the input of the pressurizing solenoid 19 is the output of a pressurizing drive circuit 23 provided by the CPU 1 with a control command that is dependent upon the welding schedule. A power supply switch 24 located on the front panel 14 of the control box 13, as shown in FIG. 2, is of the push-button type and comprises an ON push-button 24a for introducing electrical power to the system when pressed, and an OFF push-button 24b for cutting off the electrical power when pressed. Also provided on the front panel 14 is a welding repeat switch 25.

Figure 3:
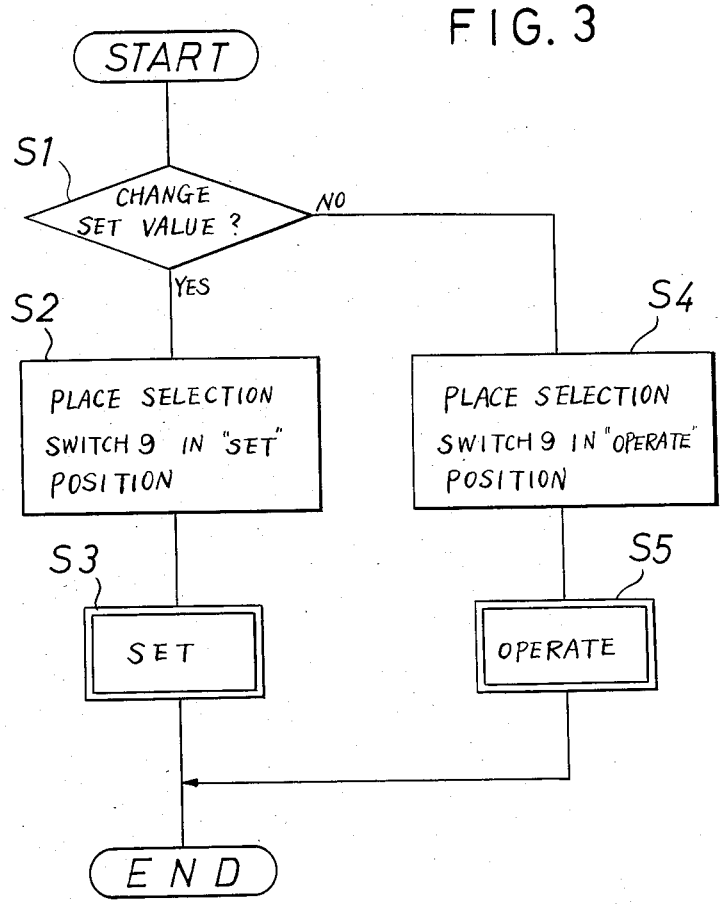
FIG. 3 is a flowchart illustrating the general features of the overall operation of the apparatus according to the present invention.

Let us now refer to the flowcharts of FIG. 3 onward to describe the operation of the preferred embodiment having the construction shown in FIGS. 1 and 2.

With reference first to the flowchart of FIG. 3, the operating procedure of the welding control system will be described.

Operation starts when the operator introduces power by pressing the ON push-button 24a of the power supply switch 24. The introduction of power initializes the control system, which includes the CPU 1. Step S1 of the flowchart calls for a decision, which is based on the welding specifications of the workpiece, as to whether values set for respective items in a welding schedule are to be altered. If a change in a set value is deemed necessary, the selection switch 9 is changed over to the "SET" position at step S2, whereby the control system is placed in the setting mode. This is followed by a step S3 wherein a setting process routine is executed by the CPU 1 on the basis of a program stored in the ROM 2. If the decision rendered at step S1 is that a change in a set value is unnecessary, then the operator places the selection switch 9 in the "OPERATE" position to put the control system in the welding operation mode. The next step is a step S5, at which the CPU 1 executes an operating process routine under the control of a program stored in the ROM 2.

Figure 4A:
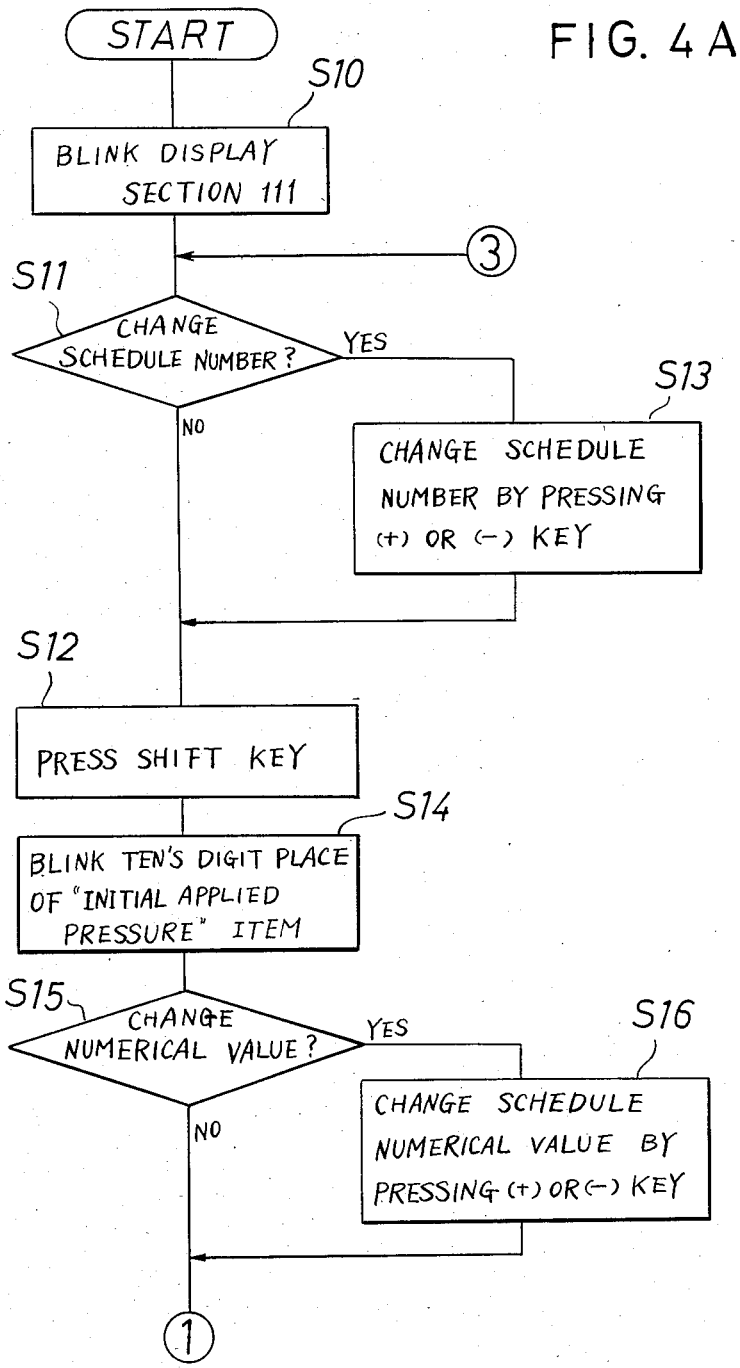
Figure 4B:
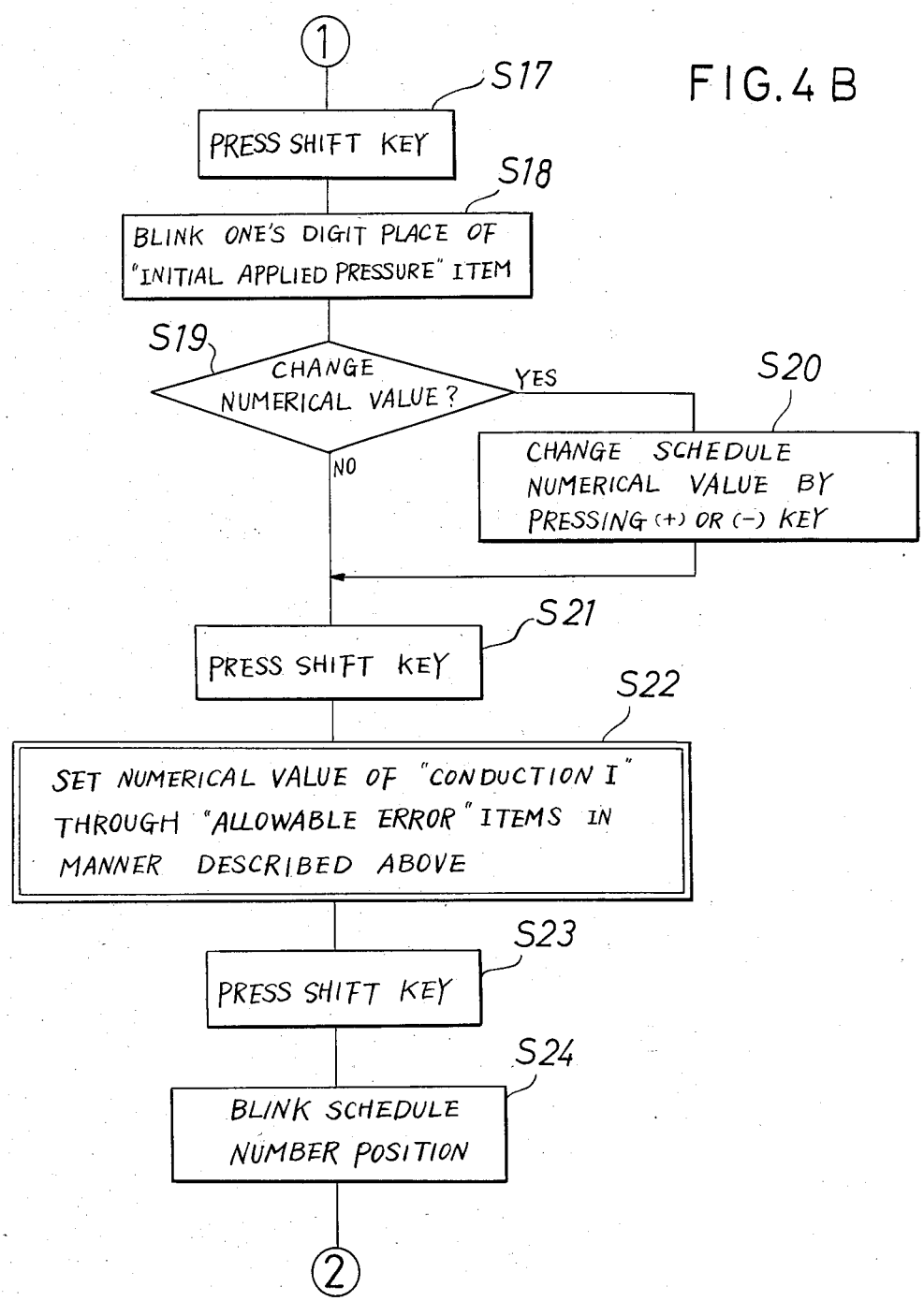

The flowchart illustrating the operating sequence of the setting process routine executed at step S3 in FIG. 3 is shown in FIGS. 4(A) through 4(C). When the operator introduces electrical power and places the selection switch S9 in the "SET" position, the program proceeds to a step S10, at which the CPU 1 causes the display unit 11 to blink a numeric character that appears in the schedule number display section 111. The blinking numeric character is a digit of from 0 to 9 decided by the state that prevailed prior to the cut off of power. In other words, the number that appeared in section 111 when the system was last turned off will reappear when power is reintroduced. The values set for the welding schedule corresponding to the blinking schedule number are read out of the non-volatile memory 5 and are displayed in digital fashion in the display sections 112 through 120 of the display unit 11.

Step S11 of the flowchart calls for the operator to observe the blinking schedule number displayed in the display section 111 for the purpose of verifying whether or not the number is one for which any of the set values is required to be changed. If it is decided that the schedule number requires no change of set values, a step S12 is the next executed. However, if a change is called for at the decision point S11, the increment key 7 (+) or decrement key 8 (−) is pressed to change the schedule number. More specifically, each time the increment key 7 or decrement key 8 is pressed, a high-level signal is produced and is read in by the CPU 1 through the interface 10 and bus 3. Whenever this occurs, the CPU 1 executes an incrementing or decrementing process to change the numeric data indicative of the schedule number, and delivers the altered numeric data to the display section 111 of the display unit 11 via the display interface 12. The item of numeric data is thus displayed in digital fashion. At the same time this takes place, the data indicative of the values previously set for the changed schedule number are retrieved sequentially from the non-volatile memory 5 and the values are digitally displayed in the corresponding display sections 112 through 120, these values appearing in place of those associated with the previous schedule number.

When the schedule number for which a set value is desired to be changed appears in the display section 111, the operator stops pressing the key 7 or the key 8 and then, at the step S12, presses the shift key 6 (→). When this is done, a high-level signal indicative of the fact is produced and is read in by the CPU 1 via the interface 10 and bus 3. At a step S14 the CPU 1 responds by designating and blinking the ten's digit place of the two-digit initial pressurization time display section 112, the duration of initial pressure application being the first item capable of being set in the prevailing schedule. Next, at a step S15, the operator decides whether or not the blinking numerical value in the ten's digit place of display section 112 needs to be changed. If the operator decides that the blinking numerical value should be changed, he presses the increment key 7 (+) or decrement key 8 (−) at a step S16 to change the numeral in the ten's place until the desired set value appears. If the decision at the step S15 is that no change is required, or when a change has been completed at the step S16, then the operator again presses the shift key 6 at a step S17, shown in FIG. 4(B). In response, the CPU 1 designates the one's digit place of the initial pressurization display section 112 at a step S18 to blink the one's digit place and to enable the numerical value displayed there to be changed. Next, at a step S19, the operator observes the numerical value in the one's place and decides whether the value needs to be changed. If the operator decides that the blinking numerical value should be changed, he presses the increment key 7 (+) or decrement key 8 (−) at a step S20 to change the numeral in the one's place until the desired set value appears. If the decision at the step S19 is that no change is required, or when a change has been completed at the step S20, then the operator again presses the shift key 6 at a step S21. In response, the position designated for a possible setting or change of value shifts to the ten's digit place of the display section 113 for the first conduction time I, whereby the value appearing in the ten's digit place is caused to blink.

Thereafter, and in similar fashion, the operator presses the shift key 6 as well as the increment and decrement keys 7, 8 in the proper order to sequentially set the first conduction time I, the welding current value I corresponding thereto, the cooling time, the second conduction time II, the welding current value II corresponding thereto, the holding time, the release time and the allowable error. These steps are indicated by a step S22, which includes an operating sequence corresponding to the sequence of steps S12 through S20.

When the operator has finished setting the allowable error, which is the last item capable of being set in the prevailing welding schedule, he again presses the shift key 6 at a step S23 to effect a return to the position of the schedule number display section 111, which is made to blink at a step S24. Accordingly, if the operator again presses the increment key 7 or decrement key 8, the blinking numerical value will change and the program will proceed to the next schedule corresponding to the schedule number currently being displayed.

When each item for each welding schedule number has been set, this is verified at a decision step S25 in FIG. 4(C). If the decision is affirmative (YES), the operating procedure moves to a step S26 at which the operator places the selection switch 9 in the "OPERATE" position. The CPU 1 responds by executing a step S27, wherein the set data corresponding to each of the welding schedules are written from the RAM 4 to the non-volatile memory 5 via an expedient such as direct memory access. This assures that data once set will not be erased or mutilated by a power failure or when the power supply is turned off at the end of an activity.

Let us now turn to the flowchart illustrated in FIGS. 5(A) and 5(B) to describe a resistance welding operation carried out in accordance with a welding schedule set in the above-described manner.

The program shown in FIG. 5 starts when the operator places the selection switch 9 in the "OPERATE" position to set the welding control system in the operating mode. With the start-up of the system, the CPU 1 decides at a step S30 whether or not the switch 16 is closed, i.e., ON. It will be remembered that the switch 16 is for designating a welding schedule conforming to the welding specifications of the workpiece being welded. If the decision rendered here is YES, then the program proceeds to a step S31, wherein the CPU 1 retrieves the particular welding schedule designated by the switch 16. It should be noted that the switch 16 is actually composed of a number of switches each of which corresponds to a welding schedule number. The CPU 1 senses which of these switches is closed in order to identify the corresponding schedule number. The program then proceeds to a step S32, at which the CPU 1 addresses the non-volatile memory 5 on the basis of the identified data to retrieve the values set for the respective items of the designated welding schedule. At this time the designated schedule number appears in the display section 111.

Thereafter, the pressurizing solenoid 19 and the power control thyristor circuit 18 are operated in response to welding commands from the CPU 1 and in accordance with the set values to sequentially execute the welding process indicated by steps S33 through S38 of the flowchart. The display sections 112 through 119 sequentially display the durations of time, namely the numbers of cycles, as well as the current values for each step of the welding process. This is a step S39 shown in FIG. 5(B). Thus, each display section functions as a welding monitor.

The program proceeds to a step S40 where the CPU 1 determines whether an error between a set value of current and a value of current which has actually flowed is equal to or less than a preset allowable percentage. If the error exceeds the allowable percentage, the program proceeds to a step S41 at which an alarm process is executed to issue a warning as by lighting a lamp or actuating a buzzer.

If the decision rendered at the step S40 is that the error is equal to or less than the allowable percentage, then the program proceeds to a step S42 where by CPU 1 determines whether the welding repeat switch 25 is closed, i.e., ON. If the decision here is affirmative, it is decided at a step S43 whether welding is continuing. A YES decision here sends the program back to the step S33 so that welding will be executed based on the same schedule. If a NO decision is rendered at the step S43, the program proceeds to a step S44 at which the designating switch 16 is turned off, i.e., opened.

If the decision at the step S42 is NO, indicating that welding is not to be repeated, then the program proceeds to a step S45 at which it is decided whether welding is continuing. If the decision here is YES, the program returns to the step S30 in FIG. 5(A) so that welding may be performed in accordance with a schedule different from the currently prevailing schedule. If the decision at the step S45 is NO, then the program proceeds to the step S44, described above. This is the end of the processing for the welding operation.

In the preferred embodiment described and illustrated hereinabove, the items constituting a welding schedule are set in the order of initial pressure application, conduction I, current value I, cooling, conduction II, current value II, hold, release and allowable error. However, the invention is not limited to this sequence. Furthermore, the keys 6, 7 and 8 can be utilized for the purpose of setting reference values when monitoring welding. In other words, it is possible to adopt an arrangement in which the keys 6, 7 and 8 are used to preset such reference values as the upper and lower limits of a conduction cycle and the upper and lower limits of current magnitude. Then, if the reference values are compared with the actually measured values of the current cycle and current magnitude, it can be determined whether the measured values are acceptable.

As many apparently widely different embodiments of the present invention can be made without departing from the spirit and scope thereof, it is to be understood that the invention is not limited to the specific embodiments thereof except as defined in the appended claims.

What we claim is:

1. Apparatus for entering program data for a programmable resistance welding machine, said apparatus having control means operatively connected to said machine for controlling the operation of the machine, said control means including a computer means having a memory for storing said program data, said apparatus comprising
    (a) a numerical data entry keyboard consisting of a shift key for producing a first signal for designating selection of an item of program data to be entered, an incrementing key for producing a second signal for incrementing the numerical value of an item of program data, and a decrementing key for producing a third signal for decrementing the numerical value of an item of program data said apparatus having no other numerical data entry keyboards;
    (b) said computer means comprising a microprocessor connected with said keyboard to receive said first, second and third signals, to sequentially designate each item of program data in said memory in response to said first signal, and to set a numerical value for each item of program data designated on the basis of said second and third signals; and
    (c) a display unit connected to said keyboard and said computer means for displaying the numerical values of each item of program data.

2. The apparatus according to claim 1, wherein said computer means has means for causing said display unit to blink the numerical value of a designated item of program data.

3. The apparatus according to claim 1, wherein said display unit has individual display sections corresponding to respective ones of the items of program data, each display section being adapted to display a numerical value resulting from a welding operation executed in accordance with said program data, whereby said numerical values are monitored during the resistance welding operation.

4. The apparatus according to claim 1, said control means further comprising a power control unit operatively connected with said machine for operating the resistance welding machine in accordance with the program data constituted by the set numerical values.

5. The apparatus according to claim 4, wherein said memory is capable of containing a plurality of sets of program data, and said power control unit comprises:
    designating switch means interfaced with said computer means for designating a set of resistance welding program data:
    current sensing means for sensing a welding current during a welding operation executed in accordance with the resistance welding program data set designated by said designating switch means, said current sensing means providing said control means with an output signal indicative of the sensed welding current;
    a power control thyristor circuit for controlling welding power in response to a command from said computer means; and
    a solenoid for applying pressure to a welding workpiece in response to a control command from said computer means, said control command conforming to the resistance welding program data set designated by said designating switch means.

* * * * *